(12) United States Patent
Crawford

(10) Patent No.: US 11,098,915 B2
(45) Date of Patent: Aug. 24, 2021

(54) HVAC SYSTEMS AND METHODS WITH REFRIGERANT PURGE

(71) Applicant: Lennox Industries Inc., Richardson, TX (US)

(72) Inventor: Carl Travis Crawford, Hickory Creek, TX (US)

(73) Assignee: Lennox Industries Inc., Richardson, TX (US)

( * ) Notice: Subject to any disclaimer, the term of this patent is extended or adjusted under 35 U.S.C. 154(b) by 135 days.

(21) Appl. No.: 16/286,564

(22) Filed: Feb. 26, 2019

(65) Prior Publication Data

US 2020/0271343 A1     Aug. 27, 2020

(51) Int. Cl.
*F24F 11/36*     (2018.01)
*F24F 11/77*     (2018.01)
*F24F 11/74*     (2018.01)

(52) U.S. Cl.
CPC .............. *F24F 11/36* (2018.01); *F24F 11/74* (2018.01); *F24F 11/77* (2018.01)

(58) Field of Classification Search
CPC .. F24F 11/36; F24F 11/77; F24F 11/44; F25B 2500/22
See application file for complete search history.

(56) References Cited

U.S. PATENT DOCUMENTS

| | | | | |
|---|---|---|---|---|
| 4,711,096 A | * | 12/1987 | Krantz | F25B 45/00 165/71 |
| 2016/0178229 A1 | * | 6/2016 | Chen | F24F 11/70 62/56 |
| 2019/0186769 A1 | * | 6/2019 | Zimmermann | F24F 11/36 |

* cited by examiner

*Primary Examiner* — Elizabeth J Martin
(74) *Attorney, Agent, or Firm* — Hubbard Johnston, PLLC

(57) ABSTRACT

In a heating, ventilating, and air conditioning (HVAC) system using a flammable refrigerant, a concentration sensor is used to check concentrations in the conditioned air or other locations. If concentrations are detected indicative a catastrophic or large leak, a purge valve is activated to immediately purge the refrigerant from the closed-conduit circuit of the system to a safe location. With lesser leaks, the blower may be activated and the leak monitored.

20 Claims, 6 Drawing Sheets

HVAC SYSTEMS AND METHODS WITH REFRIGERANT PURGE

FIELD

This application is directed, in general, to heating, ventilating and air conditioning or cooling (HVAC) systems, and more specifically, to methods and systems having a refrigerant purge.

BACKGROUND

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating or cooling). Unless otherwise indicated, as used throughout this document, "or" does not require mutual exclusivity. Various types of HVAC systems may be used to provide conditioned air for enclosed spaces.

The cooling aspect of the HVAC system utilizes a working fluid, or refrigerant, that cycles through various phases to realize cooling at a desired location. In the past, refrigerants were selected that were in large measure non-toxic and non-flammable. These refrigerants were not, however, as desirable with respect to environmental impact and global warming potential. In more recent times, a push has been made to use refrigerants that have a low or lower global warming potential. Such refrigerants are often at least mildly flammable.

SUMMARY

According to an illustrative embodiment, an HVAC system for providing conditioned air to a first closed space, wherein at least a portion of the system is disposed within a second closed space, includes a return air duct; a blower fluidly coupled to the return air duct for pulling air through the return air duct; a conditioning compartment fluidly coupled to the return duct for receiving air therefrom to be conditioned; and a cooling unit associated with the conditioning compartment for selectively cooling air therein, wherein the cooling unit is configured to receive a flammable refrigerant. The system further includes a delivery duct fluidly coupled to the conditioning compartment for discharging conditioned air from the conditioning compartment into the first closed space.

The cooling unit includes a closed-conduit circuit for containing the flammable refrigerant therein; a compressor fluidly coupled to an evaporator via a suction line, wherein the suction line forms a portion of the closed-circuit conduit and the compressor is downstream of the evaporator with respect to refrigerant flow when in a cooling mode; a condenser fluidly coupled to the compressor by a discharge line, wherein the discharge line forms a portion of the closed-conduit circuit; and an expansion valve fluidly coupled to the condenser by a liquid line, wherein the liquid line forms a portion of the closed-conduit circuit, the expansion valve configured to regulate refrigerant flow within the closed-conduit refrigeration circuit. The cooling unit also involves the evaporator being fluidly coupled to the compressor, which is downstream of the evaporator in the cooling mode, and fluidly coupled to the expansion valve, which is upstream of the evaporator in the cooling mode.

The HVAC system further includes a flammable-component detector disposed within the first closed space or second closed space, wherein the flammable-component detector is operable to produce a refrigerant concentration signal in response to a presence of refrigerant and a refrigerant-purge valve fluidly coupled to the closed-circuit conduit. The refrigerant-purge valve is moveable at least between an operative position and a purge position. The HVAC system also includes a purge line fluidly coupled to the refrigerant-purge valve at one end and having a second end positioned away from the first closed space and the second closed space and a safety controller comprising at least one processor and at least one memory. The safety controller is communicatively coupled to the flammable-component detector for receiving the refrigerant concentration signal therefrom and is coupled to the refrigerant-purge valve for selectively providing a purge-valve-control signal to the refrigerant-purge valve. The safety controller is operable to send a purge-valve-control signal to the refrigerant-purge valve to move the refrigerant-purge valve to the purge position when the refrigerant concentration signal is greater than a purge threshold.

According to another illustrative embodiment, a heating, ventilating, and air conditioning system includes a closed-conduit circuit for circulating a flammable refrigerant therein between a compressor, a condenser, an expansion valve, and an evaporator; a refrigerant sensor unit positioned proximate at least a portion of the closed-conduit circuit or a space receiving conditioned air that has been conditioned by the evaporator, wherein the refrigerant sensor unit is configured to determine a concentration of a refrigerant present and develop a refrigerant-concentration signal; and a purge valve fluidly coupled to the closed-conduit circuit, the purge valve configured to quickly discharge the flammable refrigerant from the closed-conduit circuit, wherein the purge valve comprises an actuator and the actuator moves the purge valve selectively between at least a closed position and a purge position. The system further includes a safety controller coupled to the refrigerant sensor unit and to the purge valve, wherein the safety controller has at least a processor and a memory, and wherein the safety controller is configured to provide a purge signal to the purge valve, when the refrigerant concentration signal is equal to or exceeds a purge threshold, to move the purge valve from the closed position to the purge position.

According to still another illustrative embodiment, a method of conditioning air with a heating, ventilating, and air conditioning system includes providing a flammable refrigerant into a closed-conduit circuit associated with a conditioning unit; and conditioning air with the conditioning unit to change a temperature of a return air to produce a conditioned air; fluidly coupling a purge valve on the closed-conduit circuit. The method further includes activating the purge valve to expel the flammable refrigerant from the closed-conduit circuit to a vent location when the flammable refrigerant is detected in the conditioned air or proximate the closed-conduit circuit in concentrations greater than or equal to a purge threshold. Other systems and methods and aspects are disclosed below.

BRIEF DESCRIPTION

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Figure 1:
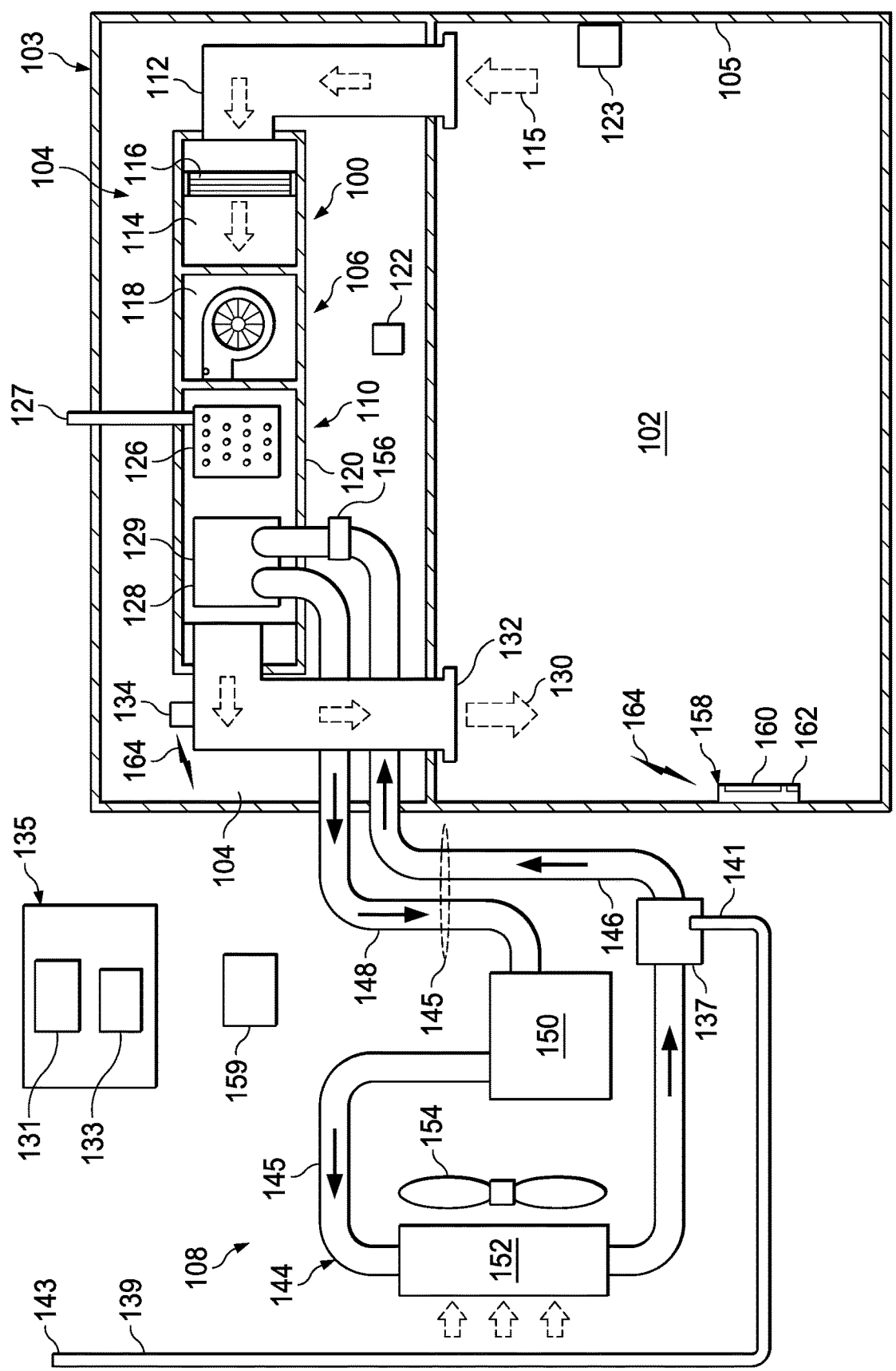
FIG. 1 is a schematic elevation view diagram of an HVAC system according to an illustrative embodiment.

Referring now to the drawings and primarily to FIG. 1, a heating, ventilating, and air conditioning (HVAC) system 100 is presented. The HVAC system 100 is for providing conditioned air to a first closed space 102, such as the interior of a building or house 103. At least a portion of the HVAC system 100 is disposed within a second closed space 104, or equipment space, e.g., an attic or air handler closet. The spaces may be defined by a plurality of walls 105. In this embodiment, a portion 106 of the system 100 is located within the building, i.e., within the second closed space 104, and a portion 108 outside the building. Typically, at least the compressor, a coil, and a fan are located outside. In a heat pump mode, the condenser and evaporator are switched using a reversing valve.

The HVAC system 100 includes an HVAC unit 110 that is disposed within the second closed space 104, or equipment space. The HVAC unit 110 includes a return air duct 112 that receives intake air 115 from the first closed space 102. The return air duct 112 may include or be coupled to a transition duct 114 that may include one or more filters 116. A blower 118 pulls the return air into the return air duct 112. The blower 118 is fluidly coupled to the return air duct 112. The blower 118 moves air into a conditioning compartment 120.

The conditioning compartment or unit 120 is fluidly coupled to the blower 118 for receiving air therefrom to be treated. The conditioning compartment 120 is formed with a plurality of compartment walls. The conditioning compartment 120 may include a portion of a delivery duct 132 in some embodiments.

The conditioning compartment 120 includes a heating device 126 and a cooling unit 128. The cooling unit 128 includes an evaporator 129 fluidly coupled to the closed-conduit circuit 145. The order of the heating device 126 and cooling unit 128 could be varied. The heating device 126 may be a furnace, hot water manifold, an electric heating element, or any source of heat. If the heating device 126 is a furnace, it may include flue pipe 127. The heating device 126 is fluidly coupled to the conditioning compartment 120 for selectively heating air therein. The cooling unit 128 is fluidly coupled to the conditioning compartment 120 for selectively cooling air therein. The cooling unit 128 includes a flammable refrigerant, or working fluid. The cooling unit 128 may be an evaporator or device for receiving heat from the air flowing over the cooling unit. The cooling unit 128 includes at least one heat exchange surface.

While the system 100 will work with many refrigerants, the system 100 is primarily concerned with flammable refrigerants. Flammable refrigerants include even mildly flammable refrigerants that if exposed to an ignition source under certain conditions could pose a risk of fire. The flammable refrigerant may be, without limitation, any of the following: any A2L, A2, A3, B2, or B3 refrigerant; R1234YF by Honeywell and DuPont; methylene chloride (R30); methyl chloride (R40); ethane (R170); propane (R290); N-Butane (R600); isobutene (R-600A); methyl formate (R611); ammonia (R717); sulfur dioxide (R764); ethylene (R1150); hydrocarbon refrigerants; halo-hydrocarbon blends; difluoromethane (R-32); etc.

Whether heated by heating device 126 or cooled by cooling unit 128, the conditioning compartment 120 produces a treated or conditioned air 130 that is delivered into the first closed space 102 by the delivery duct 132. The delivery duct 132 is fluidly coupled to the conditioning compartment 120 for discharging the treated air 130 from the conditioning compartment 120 into the first closed space 102.

A processing unit 134, or main controller, is associated with the HVAC unit 110. The processing unit 134 includes one or more processors and one or more memories. The processing unit 134 may include an input (e.g., touchpad, keyboard, etc.) and an output (e.g., display). The processing unit 134 may be communicatively coupled (in communication through wires, wireless, or other means) with the blower 118, or other devices to be monitored or controlled within the system 100. Either as an aspect of main controller 134 or as a separate controller is a safety controller 135. The safety controller 135 also has at least one processor 131 and at least one memory 133 and is configured to control a purge valve 137 as will be described.

The one or more processors of the main controller 134 and the one or more processors 131 of the safety controller 135 are configured to execute one or more sequences of instructions, programming or code stored on or in the one or more memories, which includes all types of memory devices and includes readable medium used for storage. The processor can be, for example, a general-purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. The memory, e.g., memory 133, may include one or more the following:

random access memory (RAM), flash memory, read only memory (ROM), programmable read only memory (PROM), erasable PROM, registers, hard disks, removable disks, CD-ROMS, DVDs, or any other suitable storage devices.

The cooling unit 128 is associated with a cooling subsystem 144. The cooling subsystem 144 is any system that is operational to develop a chilled working fluid for receiving heat within the cooling unit 128. In one embodiment, the cooling subsystem 144 includes a closed-conduit pathway, or closed-conduit circuit 145. The flammable refrigerant is disposed within the closed-conduit circuit 145. The closed-conduit circuit 145 includes a first refrigerant line 146 (liquid line) and a second refrigerant line 148. It will be appreciated that the first and second refrigerant lines 146, 148 in this embodiment are disposed partially within the second closed space 104 and if they were to leak, could deliver the flammable refrigerant into the second closed space 104 and thereby pose a potential safety risk—particularly if a source of ignition is present. Similarly, if the refrigerant leaks within the cooling unit 128, and therefore within the conditioning compartment 120, a risk may be posed by potential ignition sources, e.g., an open flame from a furnace. Further still, a leak in the conditioning compartment, may result in the flammable refrigerant being introduced into the closed space 102. Additional spaces may need detectors, particularly if a refrigerant line in the space has a joint. In this embodiment, the system 100 has flammable-component detectors 122 and 123.

The flammable-component detectors 122, 123 are disposed within the first closed space or second closed space, respectively. The flammable-component detector is operable to produce a refrigerant concentration signal in response to a presence of refrigerant. The flammable-component sensors, or detectors, 122 and 123 detect the presence of refrigerant and its concentration. The flammable-component detectors 122 and 123 are operable to produce a refrigerant concentration signal in response to the presence of the refrigerant.

The cooling subsystem 144 also includes a compressor 150 fluidly coupled to the closed-conduit circuit 145 for compressing the flammable refrigerant therein. A condenser 152 is fluidly coupled to the closed-conduit circuit 145 downstream of the compressor 150 for cooling the refrigerant. The condenser 152 may include one or more fans 154. An expansion device 156 is coupled to the closed-conduit circuit 145 downstream of the condenser 152 for decreasing the pressure of the refrigerant at the cooling unit 128. The portion of the closed-conduit circuit 145 between the condenser 152 and expansion device 156 is the liquid line. The cooling unit 128 includes a heat-exchange surface (not explicitly shown) and is fluidly coupled to the closed-conduit circuit or pathway 145 for receiving the flammable refrigerant.

A control unit 158 may be disposed within the first closed space 102. The control unit 158 may include a thermostat for providing control signals to the blower 118, heating device 126, or cooling unit 128 (or cooling subsystem) in response to a temperature in the first closed space 102. The control unit 158 may include an input device and a display, such as a touch-screen display 160 and a speaker 162 for audible alerts or instructions. The control unit 158 is communicatively coupled, e.g., by wireless signal 164 or wired signal, to the processing unit 134. In some embodiments, the control unit 158 and the processing unit 134 may be the same unit.

The flammable-component detector 122 is disposed within the second closed space 104 and positioned proximate the HVAC unit 110. The flammable-component detector 122, 123 is operable to produce a detection signal indicative of the level of or concentration of the flammable-component detected or a signal that a lower threshold has been reached. The flammable-component detector 123 does likewise in the first closed space 102. The flammable-component detectors or leak detectors may be any sort of detectors that utilize $O_2$ sensors, infrared technology, gas chromatographs, ultrasonic technology, ultraviolet, fluorescent dye detector, moss detectors, or other devices. In one alternative embodiment, the flammable-component detectors are indirect and comprise pressure transducers configured to detect a sudden pressure loss indicative of a catastrophic leak and that can then send an electrical signal for the refrigerant-purge valve to open.

The refrigerant-purge valve 137, purge line 139, blower, and safety controller 135 work together in various combinations to reduce risk when a leak of the flammable refrigerant in the closed-conduit circuit occurs. Most HVAC systems have considerable charges of refrigerant in them and so a substantial leak could pose and immediate risk. For example, a five-ton system may readily move 850 pounds/hour of refrigerant or more at a high stage or high speed. The refrigerant-purge valve 137 is fluidly coupled to the closed-circuit conduit 145. In this illustrative embodiment, the refrigerant-purge valve 137 is shown fluidly coupled on the liquid line, i.e., between the condenser 152 and the expansion device or valve 156. In other embodiments, the refrigerant-purge valve 137 may be placed at other locations on the closed-conduit circuit 145, e.g., between the evaporator 129 and the compressor 150.

The refrigerant-purge valve 137 is moveable at least between a closed position (purge closed) and a purge position (purge line open). The refrigerant-purge valve 137 in one embodiment is a two-way valve. In another embodiment, a three-way valve may be used with a third option being for a reservoir tank when a purge is not required.

Figure 2:
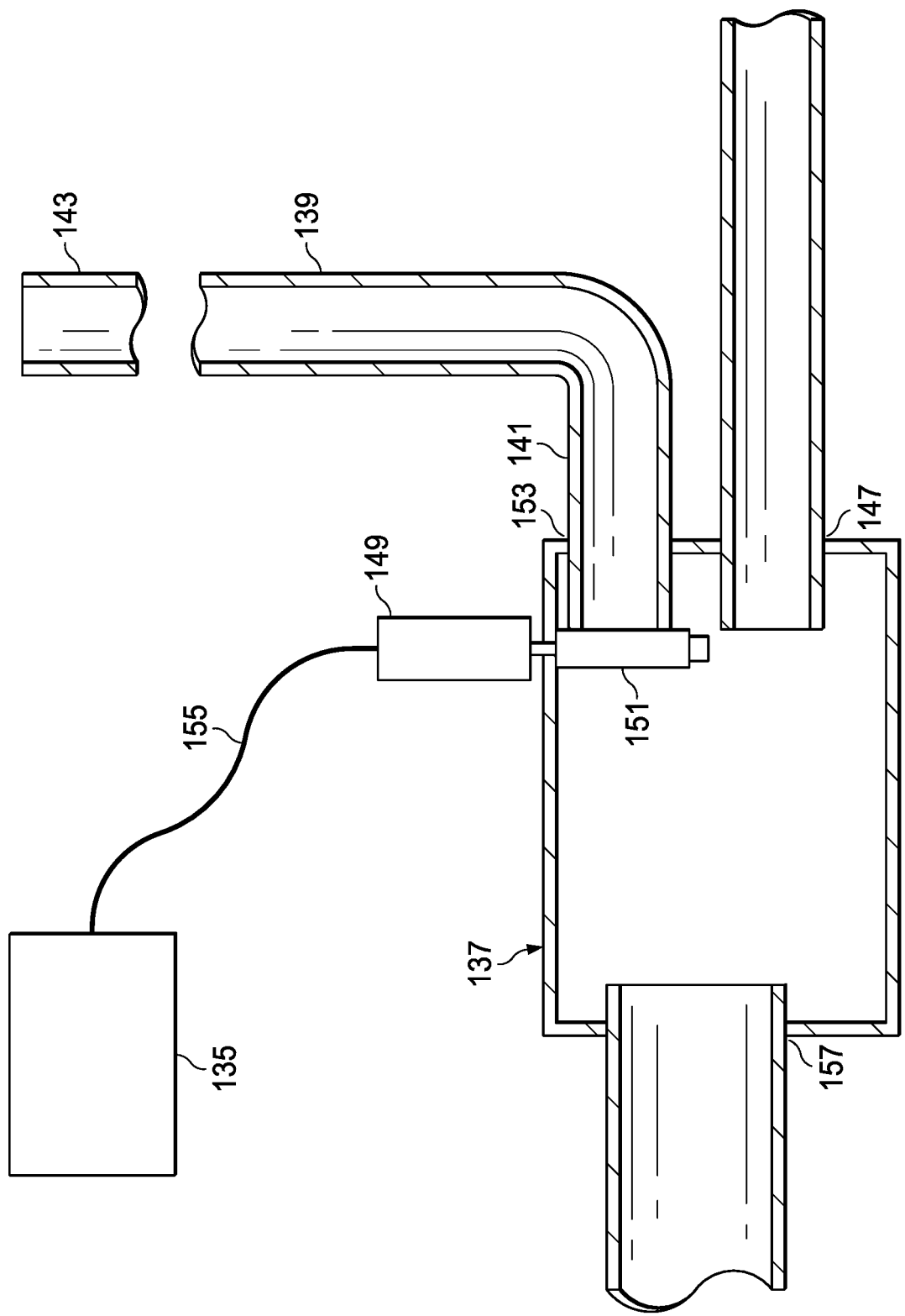
FIG. 2 is a schematic diagram in section of a purge valve according to one illustrative embodiment.

Referring to FIG. 2, an illustrative example of one possible refrigerant-purge valve 137 is shown in a closed position. In this position, the refrigerant is received at an entrance port 157 and exits through an exit port 147. An actuator 149 is coupled to a switching member 151 and is operable to selectively move it between covering a discharge port 153, as shown, and the exit port 147. The actuator 149 is communicatively coupled, e.g., by wireless signal or communication line 155, to the safety controller 135. The actuator 149 may be a motor or solenoid or other motive device, whereby a purge-control signal may be sent to the purge valve 137 to move the valve between the flow through the exit port (closed as to discharge to the purge line) and the purge positions (open to the purge line). Those skilled in the art, reading this disclosure, would understand that many valves might be used to selectively switch between flow through the exit port 147 and the discharge port 153.

Referring primarily to FIGS. 1 and 2, the purge valve 137 is fluidly coupled to the purge line 139. The purge valve 137 is fluidly coupled to the purge line 139 at one end 141 of the purge line 139, and a second end 143 of the purge line 139 is positioned away from the first closed space 102 and the second closed space 104. The second end 143 may be angled in a desired direction away from people or confined spaces. The second end 143 may have a pipe roof or release plug to provide protection from the elements. A couple of examples follow of placement of the purge line.

Figure 3:
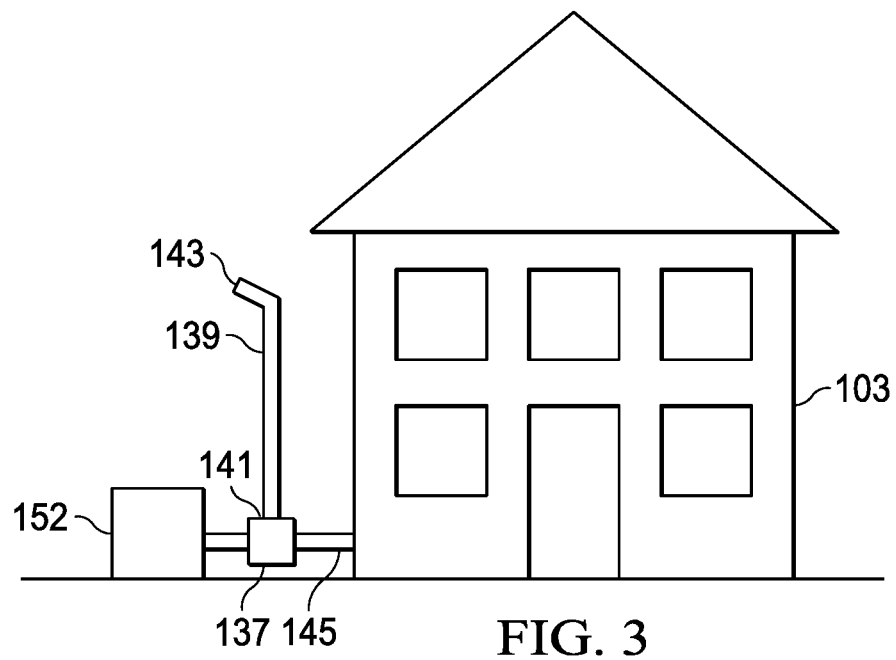
FIG. 3 is a schematic diagram in elevation of a building to which conditioned air is provided showing aspects of an illustrative HVAC system including an illustrative purge line.

FIG. 3 shows one illustrative example in which the purge line 139 is shown exterior to the house or building 103. In this example, the purge valve 137 is on the liquid line and the purge line 139 is a vertical discharge pipe extending at least partially on an exterior of a building or house 103 that is to receive conditioned air. The purge line 139 extends from the purge valve 137 at first end 141 to the second end 143 or discharge end that is positioned away from the closed spaces. The second end 143 is shown at or just below the roof line and angled away from the building or house 103. If the HVAC system 100 includes the conditioning unit in an equipment closet the purge line 139 may run from the closet to an exterior of the house or building 103.

Figure 4:
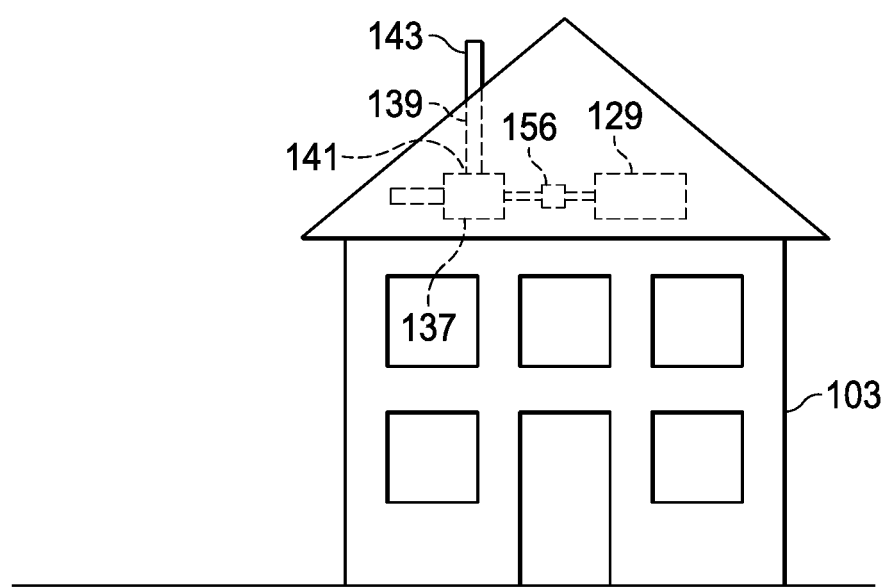
FIG. 4 is a schematic diagram in elevation of a building to which conditioned air is provided showing aspects of an illustrative HVAC system including an illustrative purge line.

FIG. 4 shows another illustrative arrangement for the purge line 139. In this example, the purge valve 137 is in the second closed space, which is an attic, of the building or house 103. The purge line 139 extends from the first end 141 at the purge valve 137 through the roof such that the second end 143 is on an exterior of the building or house 103. FIGS. 3 and 4 are only two examples, and upon reading the disclosure herein, one skilled in the art would understand that many configurations may be used to allow the flammable refrigerant to be discharged quickly away from the house or building 103. In this regard, it should be appreciated that a roof-top unit might also be used with the purge valve 137 being on the roof top itself and may not require a purge line of any appreciable length.

The HVAC 100 also includes the safety controller 135. The safety controller 135 includes at least one processor 131 and at least one memory 133. The safety controller 135 is communicatively coupled to the flammable-component detector 122, 123 for receiving the refrigerant concentration signal therefrom and is coupled to the refrigerant-purge valve 137 for selectively providing a purge-valve-control signal to the refrigerant-purge valve 137. The safety controller 135 is operable to send a purge-valve-control signal to the refrigerant-purge valve 137 to move the refrigerant-purge valve 137 to the purge position when the refrigerant concentration signal is greater than a purge threshold.

The safety controller 135 is also operable to send a control signal to the blower 118, which may be direct or via the main controller, to activate the blower 118 when a first threshold is detected by one or more flammable-component detectors 122, 123. The blower 118 would run to help dilute the refrigerant in the closed space 102.

In one embodiment, the safety controller 135 activates the blower 118 when a first threshold is detected by one or more flammable-component detectors 122, 123 and continues to monitor the concentrations from the flammable-component detectors 122, 123. If the concentrations continue to rise over a test period, the safety controller 135 will send a signal to the purge valve to purge the refrigerant from the closed-conduit circuit 145. In an alternative embodiment, a panel on the return air duct or conditioning compartment may be opened to ventilate the second closed space if that is where the refrigerant is detected.

In another alternative embodiment, if the refrigerant is detected in the second closed space 104 and is greater than or equal to a second threshold, the blower 118 may not be activated for fear of initiating a spark but rather will terminate all power to the components in the second closed space 104. In still another embodiment, the blower motor runs all the time. In still another illustrative embodiment, a second blower may be activated that ventilates the second closed space 104 and in still another embodiment the second blower is remote the second closed space 104 and the air from the second blower is directed by ducts to the second closed space 104.

In addition to operating the blower 118, the system 100 may include an audible alarm and the safety controller 135 may cause the audible alarm or speaker, e.g., speaker 162 or one in the attic, to sound if the first threshold is met or the purge threshold is met. Likewise, a visual alert may be provided to a display, e.g., display 160. Further still, the system 100 may include a communication module 159 that selectively communicates with a service provider. The communication module 159 may be an internet connection to send a signal over the internet or a cellular system or any other communicative protocol for providing an alert or message to a provider. Thus, when the first threshold is exceeded, a leak-alarm message may be sent that indicates a small leak may be occurring and when the purge threshold is reached the signal may indicate that a purge has taken place or is taking place. In one embodiment, the communications module may signal emergency personnel if the purge threshold is met.

In one illustrative embodiment, the safety controller 135 is configured to selectively activate the blower, and the safety controller is further configured to send a signal to activate the blower 118 whenever the refrigerant concentration signal indicates refrigerant present is greater than a first threshold, which is greater than zero and less than the purge threshold, and to send the purge-valve-control signal immediately to the purge valve 137 when the refrigerant concentration signal indicates refrigerant is greater than or equal to the purge threshold.

The first threshold is set at a concentration that is greater than zero and less than the purge threshold. The first threshold or flammable concentration limit may be between the nuisance trip level of the sensors used and 25% of lower flammability limit (LFL) of the refrigerant. In one illustrative embodiment, the first threshold is between 10% and 20% of the spark ignition concentration. Spark ignition concentration is the concentration of the refrigerant at which a spark will readily cause combustion. The purge threshold is between 25% and 100% of the spark ignition concentration. The second threshold is a 100% of the spark ignition concentration.

In one embodiment, the first threshold may be set at 25% of the lower flammability limit for the flammable refrigerant being used. Other safety margins—greater or lesser than 25%—may be used. For example, without limitation, the first threshold may be 10, 20, 30, 40, or 50% of the lower flammability limit.

Figure 5:
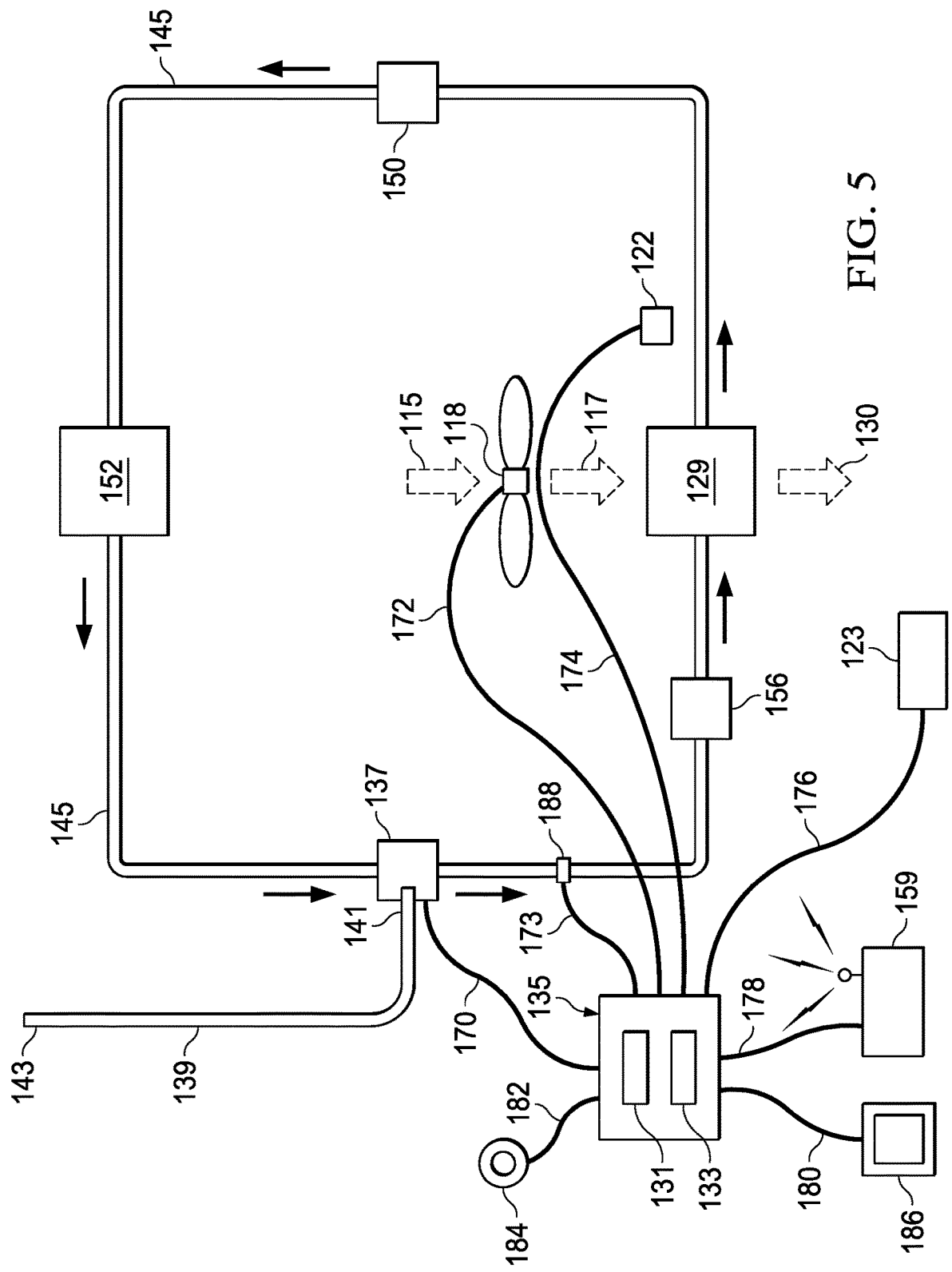
FIG. 5 is a schematic diagram of an HVAC system according to an illustrative embodiment.

Referring now primarily to FIG. 5, the HVAC system 100 of FIG. 1 is presented with a slightly different arrangement for clarity. In the previous figures, most of the interconnected components requiring control are shown with communicative coupling by wireless signals, but in FIG. 5 the components are shown communicatively coupled by communication lines 170, 172, 173, 174, 176, 178, 180, and 182. In addition, safety controller 135 is directly communicatively coupled to an alarm speaker 184 by line 182 and directly communicatively coupled by line 180 to a display 186, which may be the same or different from the display 160. In this diagram, the intake air 115 is shown being pulled by the blower 118 such that an intermediate air flow 117 flows across the evaporator 129 to produce the conditioned air 130 that goes to a first closed space 102 (FIG. 1).

In this illustrative embodiment, another variation is shown in that a pressure sensing transducer 188 has been added to the closed-conduit circuit 145 and is communicatively coupled by line 173 (but could also be wireless) to the safety controller 135. In this embodiment, if a sudden pressure loss is realized in the closed-conduit circuit 145, a catastrophic leak may be assumed and the purge valve 137 is activated by the safety controller 135. Thus, in one embodiment, the safety controller 135 is configured to send a purge-valve control signal to move the refrigerant-purge valve 137 to the purge position when a pressure measured by the pressure sensing transducer 188 drops (a triggering drop) by more than a normal system startup or shutdown pressure change within a measurement time period. Other percentage drops beyond 25% LFL may be used as the trigger, e.g., 30%, 50%, 60% or greater. The pressure drop trigger may be in addition to or in place of the refrigerant detection sensor approach. In one embodiment, even a lesser percentage might trigger a purge if the lesser drop occurs over a prolonged period; that is, a long slow pressure drop in a very tight conditioned space may eventually reach purge levels without showing a fast pressure drop in the system.

Figure 6:
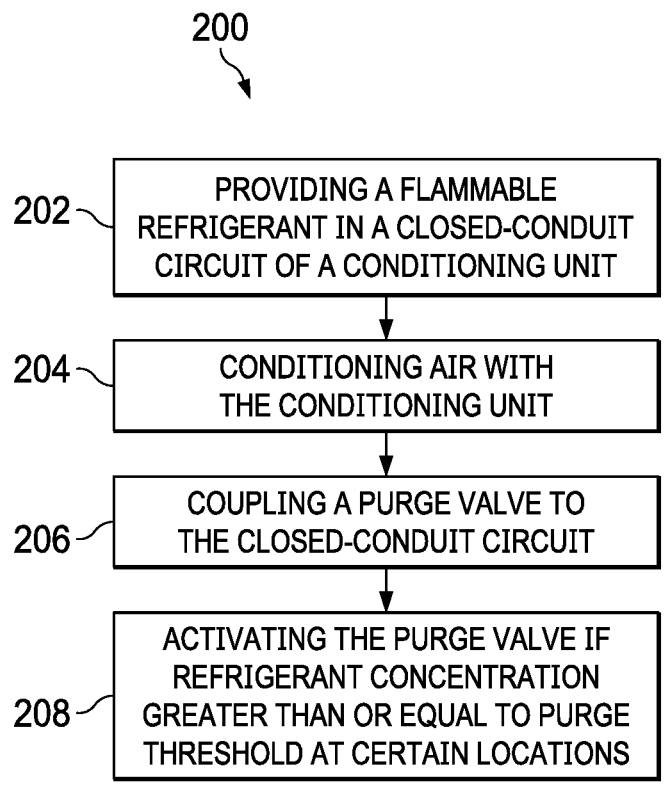
FIGS. 6 and 7 are schematic process flow diagrams showing illustrative methods involving activating a purge valve and a blower in an HVAC system.

With reference to the figures and primarily to FIG. 6, in one illustrative embodiment a method 200 of conditioning air with a heating, ventilating, and air conditioning system 100 includes providing a flammable refrigerant at 202, such as those previously mentioned, into a closed-conduit circuit 145 associated with a conditioning compartment 120. The condition compartment or unit 120 includes the evaporator 129 that received the cooled refrigerant. The method further includes conditioning air at 204 with the conditioning unit 120 to change a temperature of a return air 115 to produce a conditioned air 130 and fluidly coupling a purge valve 137 at 206 on the closed-conduit circuit 145.

The method also involves activating at step 208 the purge valve 137 to expel the flammable refrigerant from the closed-conduit circuit 145 to a vent location (see, e.g., FIGS. 3 and 4) when the flammable refrigerant is detected in the conditioned air 130 or proximate the closed-conduit circuit 145 in concentrations greater than or equal to a purge threshold by flammable-component detectors 122 and 123. In one embodiment, when the refrigerant pressure measured by a sensor 188 (or pressure sensing transducer) gets to a floor pressure, e.g., 25 or 35 psi, the purge valve either closes or goes back to a non-purge flow position.

Figure 7:
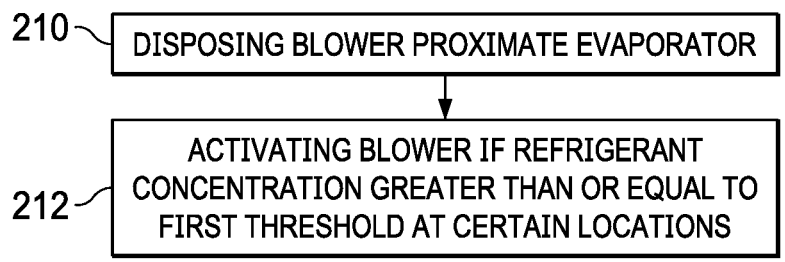

With reference to the figures and primarily FIG. 7, in another embodiment, the method of FIG. 6 continues and includes disposing (step 210) a blower 118 proximate the evaporator 129. The evaporator 129 is fluidly coupled to the closed-conduit circuit 145. The method also includes activating at 212 the blower 118 when the flammable refrigerant is detected in the conditioned air 130 or proximate the closed-conduit circuit 145 in concentrations greater than or equal to a first threshold that is greater than zero and less than the purge threshold.

In another embodiment, the method may also further include monitoring the pressure in the closed-conduit circuit, and when the pressure in the closed-conduit circuit drops by more than a triggering drop of at least 20% (or other percentage such as those previously mentioned) activating the purge valve 137 to expel the flammable refrigerant from the closed-conduit circuit 145 to a vent location, e.g., outside the house or building 103.

In an alternative embodiment, the purge valve 137 on the liquid line is activated by the safety controller 135 but instead of purging the valve 137 closes all flow so that the refrigerant is collected in the condenser 152. In still another alternative embodiment, a first closing valve may be placed upstream of the condenser, a second closing valve may be placed downstream of the condenser and upstream of the expansion valve, and when a leak is detected (e.g., first threshold is met), the second closure valve closes while the refrigerant is charged into the condenser until a floor pressure is met and then the first closure valve is closed to capture the refrigerant in the condenser. A refrigerant purge valve may be on the liquid line downstream of the second closure valve and upstream of the expansion valve or could be elsewhere on the charged portion of the closed-conduit circuit and could purge what remains at least to a floor pressure if not to zero once on the refrigerant is captured in the condenser. Meanwhile if at any point the concentrations detected get too high (greater than a threshold), the safety controller could be configured to override the efforts to capture the refrigerant in the condenser and go to purge at the purge valve.

Figure 8:
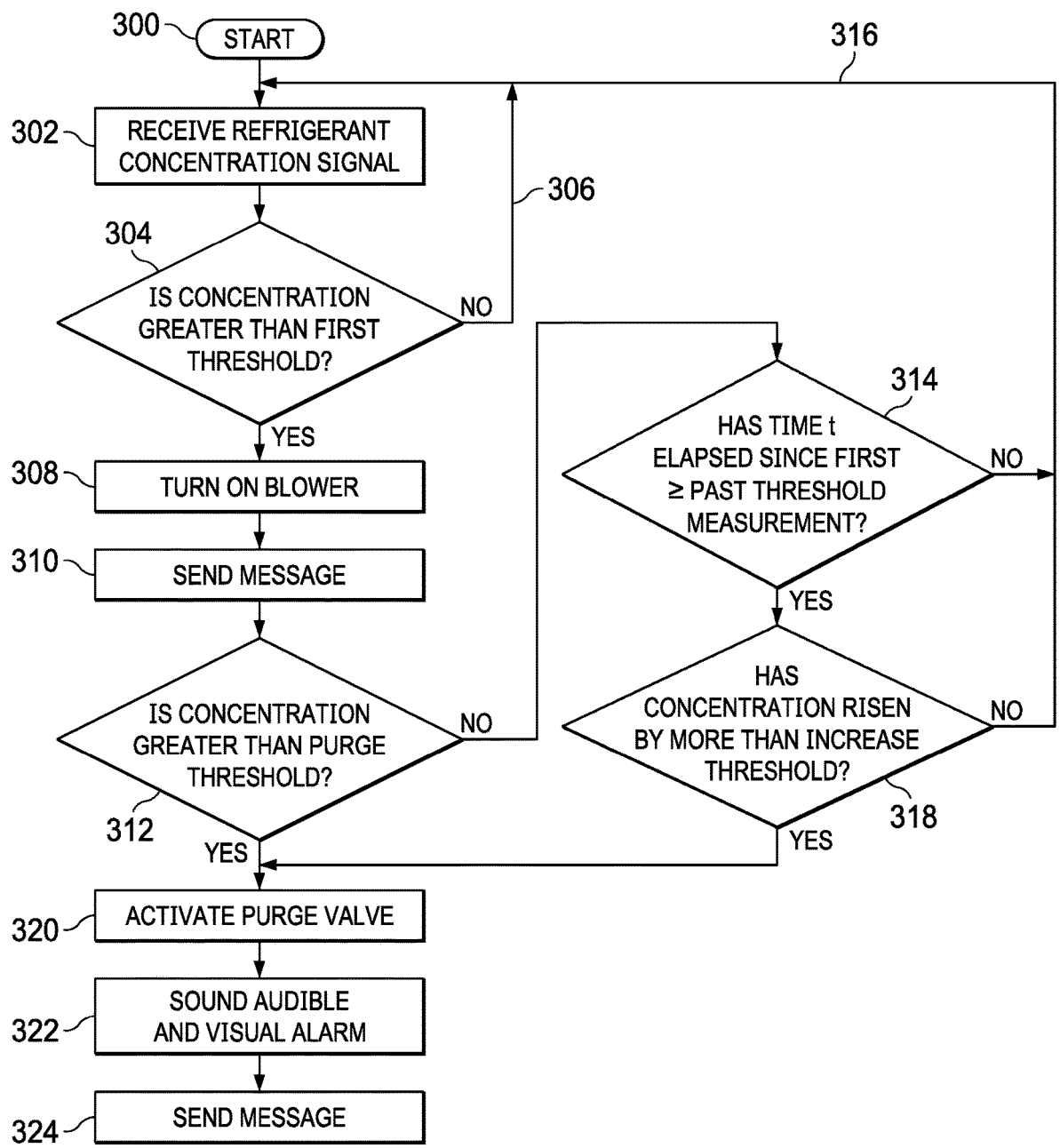
FIG. 8 is a schematic flow chart of a process executed by a safety controller according to an illustrative embodiment of an HVAC system.

Referring now primarily to FIG. 8, one of the many ways in which the safety controller 135 may be programmed is presented as a basic flow chart. The process flow begins at 300 and the first step 302 involves receiving the refrigerant concentration signal or signals. Then the interrogatory 304 reached asks if the refrigerant concentration represented by the refrigerant concentration signal is greater than or equal to a first threshold. If not, the process continues on path 306 back to 302. If the first threshold is met or exceeded, the blower (118, FIG. 1) is turned on at 308 and the communication module 159 is used to send a message at 310. The process continues to interrogatory 312, which asks if the concentration is greater than the purge threshold.

If the answer to interrogatory 312 is negative, the process continues to interrogatory 314 that asks if a specified elapsed time has passed since the first threshold was met or exceeded. If 314 is negative, the system will continue to monitor and goes back by path 316 to 302. If the specified elapsed time has elapsed at 314, the process will continue by inquiring if the concentration has increased at interrogatory 318 and specifically if it has increased by an increase threshold. If interrogatory 318 is negative, the process continues to path 316 and back to 302. If interrogatory 318 is positive, then there is an increasing leak and the process continues by activating the purge valve at 320.

Backing up again to interrogatory 312, if it is answered in the affirmative, the process continues to 320 and the purge valve is activated to purge the refrigerant from the closed-conduit circuit 145. That is followed in this example by sounding the visual and audible alarms at 322 and sending a message through the communications module as shown at step 324. These steps could be done in various orders and additional features and aspects included. For example, the pressure can be monitored simultaneously the purge valve activated 320 if the pressure drops quickly after having been stable for a set period.

Unless otherwise specified, any use of any form of the terms "connect," "engage," "couple," "attach," or any other term describing an interaction between elements is not meant to limit the interaction to direct interaction between the elements and may also include indirect interaction between the elements described. Coupling includes in some instances communicatively coupled, which may be a wireless connection or a wired connection. Coupled in some instances may refer to fluid coupling. In the discussion herein and in the claims, the terms "including" and "comprising" are used in an open-ended fashion, and thus should be interpreted to mean "including, but not limited to . . . "

It will be understood that the benefits and advantages described above may relate to one embodiment or may relate to several embodiments. It will further be understood that reference to "an" item refers to one or more of those items.

The steps of the methods described herein may be carried out in any suitable order, or simultaneously where appropriate.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. An HVAC system for providing conditioned air to a first closed space, wherein at least a portion of the system is disposed within a second closed space, the system comprising:
   a return air duct;
   a blower fluidly coupled to the return air duct for pulling air through the return air duct;
   a conditioning compartment fluidly coupled to the return duct for receiving air therefrom to be conditioned;
   a cooling unit associated with the conditioning compartment for selectively cooling air therein, wherein the cooling unit is configured to receive a flammable refrigerant;
   a delivery duct fluidly coupled to the conditioning compartment for discharging conditioned air from the conditioning compartment into the first closed space;
   wherein the cooling unit comprises:
      a closed-conduit circuit for containing the flammable refrigerant therein,
      a compressor fluidly coupled to an evaporator via a suction line, wherein the suction line forms a portion of the closed-circuit conduit and the compressor is downstream of the evaporator with respect to refrigerant flow when in a cooling mode,
      a condenser fluidly coupled to the compressor by a discharge line, wherein the discharge line forms a portion of the closed-conduit circuit,
      an expansion valve fluidly coupled to the condenser by a liquid line, wherein the liquid line forms a portion of the closed-conduit circuit, the expansion valve configured to regulate refrigerant flow within the closed-conduit refrigeration circuit, and
      the evaporator fluidly coupled to the compressor, which is downstream of the evaporator in the cooling mode, and fluidly coupled to the expansion valve, which is upstream of the evaporator in the cooling mode;
   a flammable-component detector disposed within the first closed space or second closed space, wherein the flammable-component detector is operable to produce a refrigerant concentration signal in response to a presence of refrigerant;
   a refrigerant-purge valve fluidly coupled to the closed-circuit conduit, the refrigerant-purge valve moveable at least between a closed position and a purge position;
   a purge line fluidly coupled to the refrigerant-purge valve at one end and having a second end positioned external to the first closed space and the second closed space;
   a safety controller comprising at least one processor and at least one memory, the safety controller communicatively coupled to the flammable-component detector for receiving the refrigerant concentration signal therefrom and coupled to the refrigerant-purge valve for selectively providing a purge-valve-control signal to the refrigerant-purge valve; and
   wherein the safety controller is operable to send a purge-valve-control signal to the refrigerant-purge valve to move the refrigerant-purge valve to the purge position when the refrigerant concentration signal is greater than a purge threshold.

2. The system of claim 1, wherein the refrigerant-purge valve is fluidly coupled to the closed-circuit conduit on the liquid line.

3. The system of claim 1, wherein the refrigerant-purge valve is fluidly coupled to the closed-circuit conduit on the liquid line and the purge line comprises a vertical discharge pipe extending at least partially exterior to the building.

4. The system of claim 1, wherein the building is a house, wherein the first closed space is an interior of the house and the second closed space is an attic space, and wherein the purge line comprises a vertical discharge pipe extending through a roof of the house.

5. The system of claim 1, further comprising a flammable refrigerant in the closed-conduit circuit.

6. The system of claim 1, wherein the safety controller is configured to selectively activate the blower, and wherein the safety controller is configured to activate the blower when the refrigerant concentration signal indicates a presence of refrigerant greater than a first threshold.

7. The system of claim 1, wherein the safety controller is configured to selectively activate the blower, and wherein the safety controller is configured to:
   send a signal to activate the blower whenever the refrigerant concentration signal indicates refrigerant present is greater than a first threshold, which is greater than zero and less than the purge threshold, and
   send the purge-valve-control signal immediately to the purge valve when the refrigerant concentration signal indicates refrigerant is greater than or equal to the purge threshold.

8. The system of claim 1, further comprising an audible alarm coupled to the safety controller, and wherein the safety controller is configured to activate the audible alarm when the refrigerant concentration signal indicates refrigerant is greater than or equal to the purge threshold.

9. The system of claim 1, further comprising a communications module coupled to the safety controller, and wherein the safety controller is configured to activate the communications module to send a leak-alarm message to a service provider when the refrigerant concentration signal indicates refrigerant present is greater than a first threshold.

10. The system of claim 1, further comprising a communications module coupled to the safety controller, and wherein the safety controller is configured to activate the communications module to send a purge-alarm message to a service provider when the refrigerant concentration signal indicates refrigerant is greater than or equal to the purge threshold.

11. The system of claim 1, wherein the purge threshold correlates with a concentration of the refrigerant that is susceptible to spark ignition.

12. The system of claim 7, wherein the first threshold correlates with a concentration of the refrigerant that is 10 percent of a level susceptible to spark ignition.

13. The system of claim 1, further comprising a pressure sensing transducer communicatively coupled to the safety controller, and wherein the safety controller is configured to send a purge-valve control signal to move the refrigerant-purge valve to the purge position when a pressure measured by the pressure sensing transducer drops by more than 40% within a measurement time period.

14. A heating, ventilating, and air conditioning system comprising:
- a closed-conduit circuit for circulating a flammable refrigerant therein between a compressor, a condenser, an expansion valve, and an evaporator;
- a refrigerant sensor unit positioned proximate at least a portion of the closed-conduit circuit or a space receiving conditioned air that has been conditioned by the evaporator, wherein the refrigerant sensor unit is configured to determine a concentration of a refrigerant present and develop a refrigerant-concentration signal;
- a purge valve fluidly coupled to the closed-conduit circuit, the purge valve configured to discharge the flammable refrigerant from the closed-conduit circuit, wherein the purge valve comprises an actuator and the actuator moves the purge valve selectively between at least a closed position and a purge position; and
- a safety controller coupled to the refrigerant sensor unit and to the purge valve, wherein the safety controller has at least a processor and a memory, and wherein the safety controller is configured to provide a purge signal to the purge valve, when the refrigerant concentration signal is equal to or exceeds a purge threshold, to move the purge valve from the closed position to the purge position.

15. The system of claim 14, further comprising a blower associated with at least the evaporator and coupled to the safety controller, and wherein the safety controller is configured to activate the blower when the refrigerant concentration signal is equal to or exceeds a first threshold, wherein the first threshold is greater than zero and less than the purge threshold.

16. The system of claim 14, further comprising a communications module for contacting a service provider with a message, wherein the communications module is coupled to the safety controller, and wherein the safety controller is configured to activate the communications module to send the message to the service provider when the refrigerant concentration signal is equal to or exceeds a first threshold.

17. The system of claim 14, further comprising a communications module for contacting a service provider with a message, wherein the communications module is coupled to the safety controller, and wherein the safety controller is configured to activate the communications module to send the message to the service provider when the refrigerant concentration signal is equal to or exceeds a first purge threshold.

18. A method of conditioning air with a heating, ventilating, and air conditioning system, the method comprising:
- providing a flammable refrigerant into a closed-conduit circuit associated with a conditioning unit;
- conditioning air with the conditioning unit to change a temperature of a return air to produce a conditioned air, wherein the conditioning unit comprises an evaporator;
- fluidly coupling a purge valve on the closed-conduit circuit; and
- activating the purge valve to expel the flammable refrigerant from the closed-conduit circuit to a vent location when the flammable refrigerant is detected in the conditioned air or proximate the closed-conduit circuit in concentrations greater than or equal to a purge threshold.

19. The method of claim 18, further comprising:
- disposing a blower proximate the evaporator, wherein the evaporator is fluidly coupled to the closed-conduit circuit; and
- activating the blower when the flammable refrigerant is detected in the conditioned air or proximate the closed-conduit circuit in concentrations greater than or equal to a first threshold that is greater than zero and less than the purge threshold.

20. The method of claim 18, further comprising monitoring the pressure in the closed-conduit circuit, and when the pressure in the closed-conduit circuit drops by more than at least 20%, activating the purge valve to expel the flammable refrigerant from the closed-conduit circuit to a vent location.

* * * * *